(12) United States Patent
Just et al.

(10) Patent No.: US 9,777,573 B2
(45) Date of Patent: Oct. 3, 2017

(54) RADIAL PISTON ENGINE WITH BRAKE

(71) Applicant: Robert Bosch GmbH, Stuttgart (DE)

(72) Inventors: Hendrik Just, Lohr (DE); Khaled Tibari, Witten (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 14/397,588

(22) PCT Filed: Apr. 16, 2013

(86) PCT No.: PCT/EP2013/057853
§ 371 (c)(1),
(2) Date: Oct. 28, 2014

(87) PCT Pub. No.: WO2013/160145
PCT Pub. Date: Oct. 31, 2013

(65) Prior Publication Data
US 2015/0128797 A1 May 14, 2015

(30) Foreign Application Priority Data

Apr. 28, 2012 (DE) .................. 10 2012 008 622

(51) Int. Cl.
*F04B 1/04* (2006.01)
*F01B 13/06* (2006.01)
(Continued)

(52) U.S. Cl.
CPC .......... *F01B 13/061* (2013.01); *B60T 1/062* (2013.01); *F03C 1/04* (2013.01); *F03C 1/0403* (2013.01);
(Continued)

(58) Field of Classification Search
CPC ...... F03C 1/0447; F03C 1/0403; F16D 55/24; F16D 55/38; F16D 55/40; B60T 1/062; B60B 27/065; B60B 27/001; F04B 1/04
See application file for complete search history.

(56) References Cited

U.S. PATENT DOCUMENTS 6,102,489 A * 8/2000 Boese .................. B60B 27/001
301/124.1
6,347,571 B1 * 2/2002 Cunningham ........ F03C 1/0447
417/214
6,357,558 B1 * 3/2002 Case .................... F03C 1/0403
188/170

FOREIGN PATENT DOCUMENTS

DE        195 04 451 B4   8/1996
DE        600 11 352 T2   6/2005
(Continued)

OTHER PUBLICATIONS

International Search Report corresponding to PCT Application No. PCT/EP2013/057853, mailed Feb. 27, 2014 (German and English language document) (7 pages).

*Primary Examiner* — Logan Kraft
*Assistant Examiner* — Abiy Teka
(74) *Attorney, Agent, or Firm* — Maginot, Moore & Beck LLP

(57) ABSTRACT

A radial piston motor comprises cylinder-piston units arranged in a star shape, a housing, an output shaft, an inner axial housing collar, an outer axial shaft collar, an output flange, an output shaft, and a brake positioned at least in certain sections between the inner axial housing collar and the outer axial shaft collar. The output flange is attached to the output shaft. The output flange is attached to the shaft collar radially outside the shaft collar.

14 Claims, 1 Drawing Sheet

(51) Int. Cl.
　　　*F03C 1/04*　　　　(2006.01)
　　　*F04B 1/047*　　　(2006.01)
　　　*F03C 1/047*　　　(2006.01)
　　　*F03C 1/40*　　　　(2006.01)
　　　*F16D 55/24*　　　(2006.01)
　　　*F16D 55/38*　　　(2006.01)
　　　*B60T 1/06*　　　　(2006.01)

(52) U.S. Cl.
　　　CPC ............ *F03C 1/047* (2013.01); *F03C 1/0447* (2013.01); *F04B 1/04* (2013.01); *F04B 1/047* (2013.01); *F16D 55/24* (2013.01); *F16D 55/38* (2013.01)

(56) References Cited

FOREIGN PATENT DOCUMENTS

| EP | 0 887 548 A1 | 12/1998 |
| EP | 1 072 814 A1 | 1/2001 |
| EP | 1 038 102 B1 | 11/2002 |
| GB | 2 269 207 A | 2/1994 |

\* cited by examiner

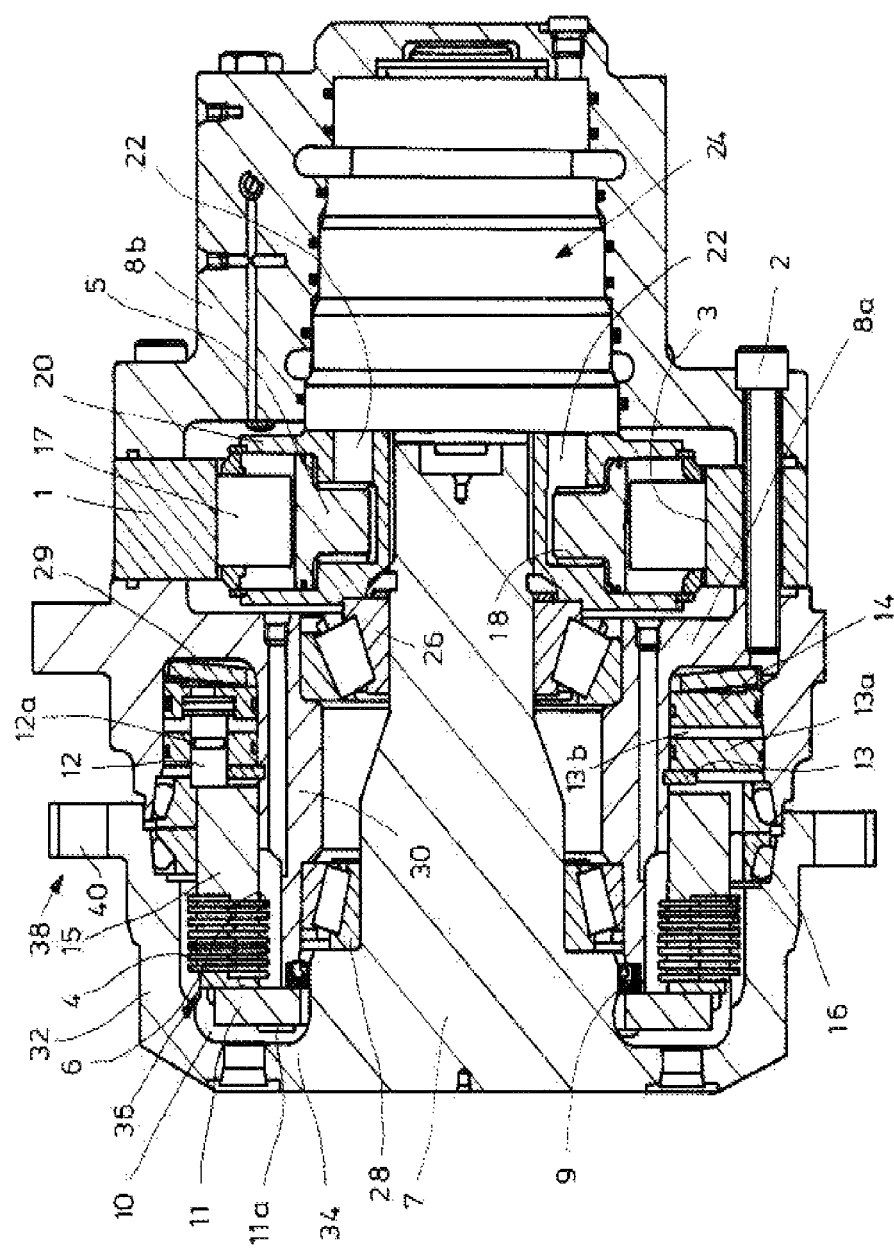

RADIAL PISTON ENGINE WITH BRAKE

This application is a 35 U.S.C. §371 National Stage Application of PCT/EP2013/057853, filed on Apr. 16, 2013, which claims the benefit of priority to Serial No. DE 10 2012 008 622.9, filed on Apr. 28, 2012 in Germany, the disclosures of which are incorporated herein by reference in their entirety.

The disclosure relates to a hydrostatic radial piston motor having a brake.

BACKGROUND

Such radial piston motors are used to drive mobile machines such as vibrating rollers, forklift trucks, road rollers, road milling machines and wheel loaders. Radial piston motors have a multiplicity of cylinder-piston units arranged in a star shape, wherein the pistons can be supported on the outside or the inside. The cylinder-piston units can rotate along with the output shaft or rest essentially fixed to the housing. For example drum brakes and multiplate brakes which run dry or in oil are known as brakes for such radial piston motors, it being possible to implement said brakes such that they are integrated into the motor. Multiplate brakes have a multiplicity of annular-disk-shaped plates which bear one against the other, and to each of whose bearing regions portions of the total braking force or of the total braking torque are transmitted. For this purpose, the plates are alternately coupled in a rotationally fixed fashion to a component which is to be braked and to a housing. To bring about braking, the plates are pressed together in the axial direction. For this purpose, they can be shifted axially by a small amount compared to the component to be braked or with respect to the housing.

Document DE 195 04 451 B4 presents a radial piston motor with a multi-disk brake which is arranged laterally next to the cylinder-piston units thereof. In this context, the plates are arranged laterally or axially next to the cylinder-piston units and between a radially inner section of an output shaft and a radially outer housing. Accordingly, the plates are alternately connected in a rotationally fixed fashion to the housing and to the section of the output shaft. The section of the output shaft is implemented as a radial extension of the shaft or as a sleeve-like shaft collar, in the interior of which one or two roller bearings of a shaft bearing are provided.

Document U.S. Pat. No. 6,357,558 also presents a radial piston motor with a multiplate brake. The principle of the multiplate brake is changed here compared to the document mentioned last in that the plates are arranged between a radially inner, sleeve-like housing collar and a radially outer, sleeve-like shaft collar. A bearing for the shaft is located in the interior of the housing collar.

In both specified documents, a device which is to be driven—for example a wheel—is connected by flanges to the shaft. In this context, the output flange and its connecting elements (holes or pins) are formed on the end side of the shaft and are spaced apart axially with respect to the brake here.

A disadvantage of such radial piston motors with brakes is the overall length which results from the arrangement in a row, when considered in the axial direction, of the output flange, brake and cylinder-piston units. Furthermore, the attachment possibilities to the output flange are restricted.

SUMMARY

In contrast, the disclosure is based on the object of providing a radial piston motor of compact design with a brake whose axial overall length is reduced. Furthermore, the attachment possibilities to the output flange are to be improved easily.

This subject is achieved by means of a radial piston motor having the features of Patent Claim 1.

The radial piston motor according to the disclosure has cylinder-piston units arranged in a star shape, a housing and an output shaft, wherein at least parts of a brake are arranged between an inner axial, sleeve-like collar of the housing and an outer axial, sleeve-like collar of the output shaft. An output flange, which serves to hold, for example, a wheel which is driven by the motor, is attached to the output shaft. The output flange is attached to the outer circumference of the shaft collar, radially outside said shaft collar. The output flange can have a ring of drilled holes. A radial piston motor with a brake is therefore provided whose overall axial length is reduced. Furthermore, the attachment possibilities to the output flange arranged on the outermost circumference are expanded since it is accessible on both sides.

Further advantageous refinements of the disclosure are described.

The radial piston motor preferably has, for supporting the output shaft, two bearings, in particular tapered roller bearings, in the housing. In this context at least one of the two bearings is accommodated in the housing collar. The overall axial length of the radial piston motor according to the disclosure is therefore reduced further. In order to provide optimum support, the output flange is arranged between the two bearings, viewed in the axial direction.

If the axial shaft collar is formed in one piece with the output shaft, the strength can be increased. A single-piece formation of the output flange with the axial shaft collar also serves to promote the strength of the output shaft. In particular, the manufacturing costs can also be kept low.

A particularly preferred embodiment of the brake is a multiplate brake with alternately housing-collar-side plates and shaft-collar-side plates. The plate stack which is formed in this way is therefore arranged between the inner axial housing collar and the outer axial shaft collar.

In order to activate the brake, the plates can be pressed by a disk spring, via a circular-disk-shaped piston, against a retaining ring which is attached to the end side of the housing collar.

For technical safety reasons, it is preferred if the disk spring can be tensioned, via an annular pressure space and via the piston, in the direction away from the plates in order to release the brake, wherein the plates are relieved of tension. The brake is therefore closed in the event of failure of the hydraulics.

A preferred development has a circular-disk-shaped sealing ring, by means of which the pressure space is bounded and sealed with respect to a brake space. The plates are arranged in the brake space.

The pressure space and the sealing ring are penetrated by a plurality of—preferably three—stepped pins, which bear, on the one hand, against the piston and, on the other hand, against a spacer bushing, wherein the pins each have a seal to seal the pressure space. The spacer bushing bears against a housing-collar-side plate, which forms the first plate of the plate stack.

A double-cone seal for sealing the brake space with respect to the surroundings is preferably provided between the output flange or the shaft collar and the housing. The seal has two parts, one of which rotates and the other is fixed to the housing. They bear against one another via two planar surfaces, between which a hydrostatic bearing is formed.

So that the radial piston motor according to the disclosure is suitable for mobile machines, it can be developed as a slow-running multi-stroke motor with a large swept volume and a large output torque. According to the concept of the outer piston support, a stroke ring which surrounds the cylinder-piston units can be provided. The latter can form part of the housing.

The stroke ring is preferably clamped in between a first housing part and a second housing part, wherein a first seal, which bears against the first housing part, is attached to the stroke ring, and wherein a second seal, which bears against the stroke ring, is arranged on the second housing part. As a result, the housing can be mounted in such a way that firstly the stroke ring is lowered onto the second housing part and its seal, and that the first housing part is then lowered onto the stroke ring and its seal. In this context, the respective seal is held lying in a corresponding groove by gravity.

In one preferred refinement of the radial piston motor according to the disclosure, the two bearings engage around the output shaft, the housing collar engages around at least one of the bearings, the brake engages around the housing collar, the shaft collar engages around the brake and the output flange engages around the shaft collar.

In order to provide a long guiding means for the pistons in the cylinders, it is preferred if the cylinders and the pistons of the cylinder-piston units are stepped. As a result, enough space for the ducts via which the cylinders are alternately connected to a high-pressure side and a low-pressure side of the radial piston motor is produced in the center of the cylinder-piston units.

BRIEF DESCRIPTION OF THE DRAWING

The FIGURE shows an embodiment of a radial piston motor in a longitudinal section through the center axis.

In the text which follows, an exemplary embodiment of a radial piston motor according to the disclosure will be described in detail with reference to the FIGURE.

DETAILED DESCRIPTION

In the FIGURE, the radial piston motor is shown in a longitudinal section through the center axis. The radial piston motor has a first housing part 8a and a second housing part 8b, between which a stroke ring 1 is attached by means of screws 2. A corrugated stroke cam 3 is provided on the internal circumference of the stroke ring 1, which therefore forms a third housing part. In the interior of the stroke ring 1, a multiplicity of pistons 5 are supported on the stroke cam 3 via a respective roller 17, wherein the pistons 5 are stepped and are guided in a respective cylinder 18, which is also stepped. In this context, the cylinders 18 are arranged in a star shape in a rotor 20 which is driven in rotation via the pistons 5 which are expelled radially outward, and in the context said rotor 20 entrains an output shaft 7. For this purpose, the cylinders 18 are connected alternately to a high-pressure port and a low-pressure port (neither shown) of the radial piston motor via a commutator 24 and via respective radial ducts 22 which are formed in the rotor 20.

Adjacent to the rotor 20, a first tapered roller bearing 26 is mounted on the output shaft 7. A second tapered roller bearing 28 is mounted in the region of a radial extension of the output shaft 7. The output shaft 7 is mounted in the first housing part 8a by means of the two tapered roller bearings 26, 28, wherein the second tapered roller bearing 28 is arranged in an axially protruding housing collar 30 of the first housing part 8a.

A shaft sealing ring 9, which bears against a further radial extension of the output shaft 7, is attached to an end section of the housing collar 30. As a result, the shaft sealing ring 9 separates a bearing region formed between the housing collar 30 and the output shaft 7, from a brake space 10 which is formed on the outer circumference of the housing collar 30. Said brake space 10 is bounded radially on the inside by the housing collar 30, while it is bounded radially on the outside by a shaft collar 32 which is formed in one piece on the output shaft 7 via a disk section 34. The brake space 10 is therefore bounded in the axial direction, on the one hand, by the disk section 34 of the output shaft 7 and, on the other hand, by the first housing part 8a.

Arranged in the brake space 10 is a plate stack 36 of a multiplate brake, wherein the plate stack 36 has a multiplicity of individual plates which are alternately formed as shaft-collar-side plate 4 and housing-collar-side plate 6. In this context, the shaft-collar-side plates 4 are attached at their outer circumference to the shaft collar 32 in a rotationally fixed fashion, while the housing-collar-side plates 6 are attached via their internal circumference to the housing collar 30 in a rotationally fixed fashion. On its left-hand side in FIG. 1, the plate stack 36 is supported on the first housing part 8a via a retaining ring 11 and via the housing collar 30. For this purpose, the retaining ring 11 is attached to the housing collar 30 via a plurality of screws 11a. On its right-hand side in FIG. 1, a spacer bushing 15 bears against the plate stack 36 or against the first housing-collar-side plate 6 thereof. The spacer bushing 15 is pretensioned in the "braking" direction (from right to left in FIG. 1) by a disk spring 29 via an annular piston 14 and via pins 12 which are distributed uniformly on the circumference.

Via an annular pressure space 13b, the piston 14 can be moved in the "release brake" direction (from left to right in FIG. 1) counter to the force of the disk spring 29, as a result of which pressure of the plate stack 36 is cancelled out. In this context, the pressure space 13b is bounded and separated from the pressure space 10 by means of a sealing ring 13a, wherein the sealing ring 13a is supported on the housing collar 30 via a circlip 13. The pins 12 bear against the piston 14 and extend therefrom through the pressure space 13b and through the sealing ring 13a and bear against the spacer sleeve 15 on its side facing away from the plate stack 36. In order to seal the pressure space 13b, the pins 12 have respective seals 12a.

The disk spring 29, the piston 14, the pressure space 13b, the sealing ring 13a, the circlip 13 and the pins 12 are accommodated completely in a recess in the first housing part 8a, which is bounded radially on the inside by the housing collar 30 and radially on the outside by a further housing collar. The brake space 10 is surrounded on its outer side by the rotatable shaft collar 32. A double-cone seal 16, which permits the shaft collar 32 to rotate with respect to the further housing collar of the first housing part 8a and at the same time seals the brake space 10 with respect to the surroundings, is arranged on the outer circumference of the spacer bushing 15 in a radially spaced-apart fashion.

According to the disclosure, an output flange 38 is arranged in one piece on the shaft collar 32 and therefore on the output shaft 7, on the outer circumference of the shaft collar 32 in its region facing away from the disk section 34. The output flange 38 is embodied as a disk-like, radial extension and has drilled through-holes 40 distributed over its circumference, via which, for example, a wheel (not shown) can be attached to the radial piston motor.

As a result, the shaft collar 32 extends, when viewed in the axial direction, from the disk element 34 as far as the output flange 38, wherein in order to provide optimum support the output flange 38 is arranged, when viewed in the axial direction, between the two tapered roller bearings 26, 28. High radial forces can therefore be absorbed by the output flange 38 via the shaft collar 32, via the disk element 34 and via the output shaft 7 and conducted away into the two bearings 26, 28. In this context, the axial installation space of the two bearings 26, 28, of the brake and of the output flange 38 are minimized by virtue of the fact that these components are arranged on one side of the cylinder-piston units 5, 18 (on the left in FIG. 1) in an axially minimum installation space. This minimization of the installation space occurs according to the disclosure by virtue of the fact that the output flange 38 engages around the brake viewed in the radial direction, and that the brake engages around the two bearings 26, 28, viewed in the radial direction.

In contrast to the exemplary embodiments shown, the plate stack 36 can be tensioned by the disk spring 29, via the spacer bushing 15, against the disk section 34 of the output shaft 7. In this context, the retaining ring 11 is eliminated. As a result, the number of plates 4, 6 can be increased, and therefore relatively high braking torque can be transmitted with the same force of the disk spring 29.

A radial piston motor a cylinder-piston units arranged in a star shape, a housing and an output shaft is disclosed. A brake—in particular the plates thereof—is arranged at least in certain sections between an inner axial sleeve-like collar of the housing and an outer axial sleeve-like collar of the output shaft. An output flange, for example for attachment of a wheel driven by the motor, is attached to the output shaft. The output flange is attached to the axial shaft collar radially outside said shaft collar. The output flange can have a ring of drilled holes which is correspondingly also arranged on the axial shaft collar, radially outside said shaft collar.

The invention claimed is:

1. A radial piston motor, comprising:
    cylinder-piston units arranged in a star shape;
    a housing having a radially inner axially-extending housing collar;
    an output shaft including an axially extending shaft collar located radially outside the housing collar;
    an output flange configured to support a wheel, the output flange arranged and attached to on an outer circumference of the shaft collar; and
    a brake positioned at least partially between the housing collar and the shaft collar in a radial direction; wherein two bearings rotatably supporting the output shaft in the housing, wherein at least one of the two bearings is accommodated in the housing collar; and wherein an axial position of the output flange is entirely between an axial position of the two bearings.

2. The radial piston motor according to claim 1, wherein the shaft collar is formed in one piece with the output shaft.

3. The radial piston motor according to claim 1, wherein the output flange is formed in one piece with the shaft collar.

4. The radial piston motor according to claim 1, wherein the brake is a multiplate brake with housing-collar-side plates and shaft-collar-side plates.

5. The radial piston motor according to claim 4, wherein, to activate the brake, the housing-collar-side plates and the shaft-collar-side plates are configured to be pressed by a disk spring, via a circular-disk-shaped piston, against a retaining ring attached to an end side of the housing collar.

6. The radial piston motor according to claim 5, wherein, to release the brake, the disk spring is configured to be tensioned, via an annular pressure space and via the piston, in a direction away from the housing-collar-side plates and the shaft-collar-side plates.

7. The radial piston motor according to claim 6, further comprising a circular-disk-shaped sealing ring by which the pressure space is bounded and sealed with respect to a brake space, wherein the housing-collar-side plates and the shaft-collar-side plates are positioned in the brake space.

8. The radial piston motor according to claim 1, wherein the radial piston motor is configured as a multi-stroke motor with a stroke ring that surrounds the cylinder-piston units.

9. The radial piston motor according to claim 8, wherein:
    the housing includes a first housing part and a second housing part;
    the stroke ring is clamped in between the first housing part and the second housing part;
    a first seal bears against the first housing part and is attached to the stroke ring; and
    a second seal bears against the stroke ring and is positioned on the second housing part.

10. The radial piston motor according to claim 1 wherein;
    the two bearings circumferentially surround a first axial portion of the output shaft;
    the housing collar circumferentially surrounds at least one of the two bearings;
    the brake circumferentially surrounds a second axial portion of at least a portion of the housing collar;
    the shaft collar circumferentially surrounds at least a third axial portion of the brake; and
    the output flange circumferentially surrounds at least a fourth axial portion of the shaft collar.

11. The radial piston motor according to claim 1, wherein the output flange is located axially between an end face of the output shaft and the cylinder-piston units.

12. The radial piston motor according to claim 1, wherein the output flange is directly connected to the outer circumference of the shaft collar.

13. A radial piston motor comprising:
    cylinder-piston units arranged in a star shape;
    a housing;
    an output shaft;
    an inner axial housing collar;
    an outer axial shaft collar;
    an output flange attached to the output shaft; and
    a brake positioned at least in certain sections between the housing collar and the shaft collar, wherein:
        the output flange is attached to the shaft collar radially outside the shaft collar
        to activate the brake, the housing-collar-side plates and the shaft-collar-side plates are configured to be pressed by a disk spring, via a circular-disk-shaped piston, against a retaining ring attached to an end side of the housing collar;
        to release the brake, the disk spring is configured to be tensioned, via an annular pressure space and via the piston, in a direction away from the housing-collar-side plates and the shaft-collar-side plates;
        the radial piston motor further comprises a circular-disk-shaped sealing ring by which the pressure space is bounded and sealed with respect to a brake space, wherein the housing-collar-side plates and the shaft-collar-side plates are positioned in the brake space;
        the pressure space and the sealing ring are penetrated by a plurality of stepped pins which bear against the piston and against a spacer bushing;
        the pins each have a seal; and the spacer bushing bears against one of the housing-collar-side plates.

14. The radial piston motor according to claim 7, further comprising a double-cone seal configured to seal the brake space with respect to surroundings and positioned between the output flange or the shaft collar and the housing.

\* \* \* \* \*